June 9, 1953          H. E. WILT          2,641,378
HAND POWERED TOOL FOR UPSETTING HOLLOW RIVETS
Filed June 1, 1949
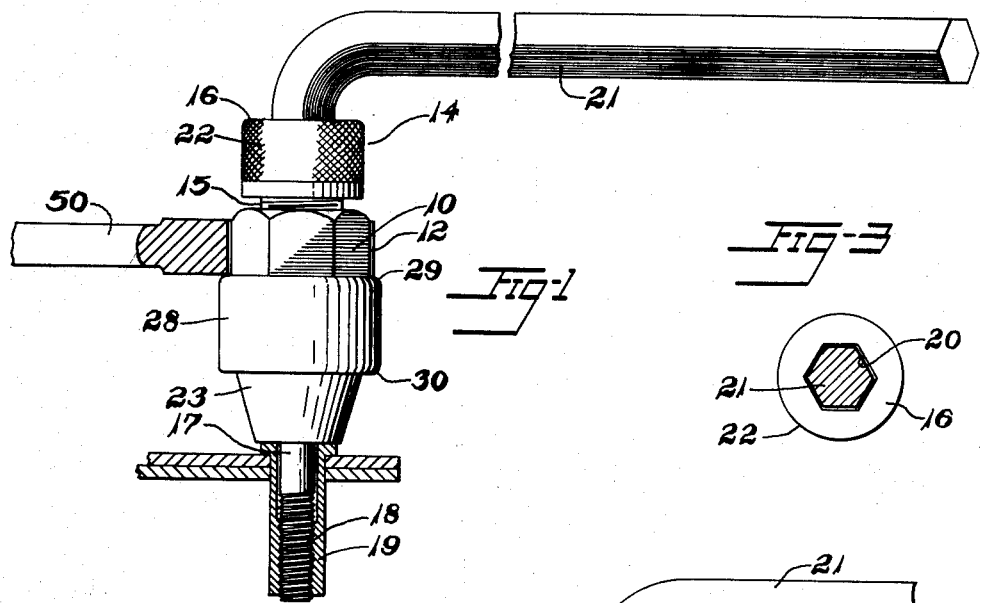
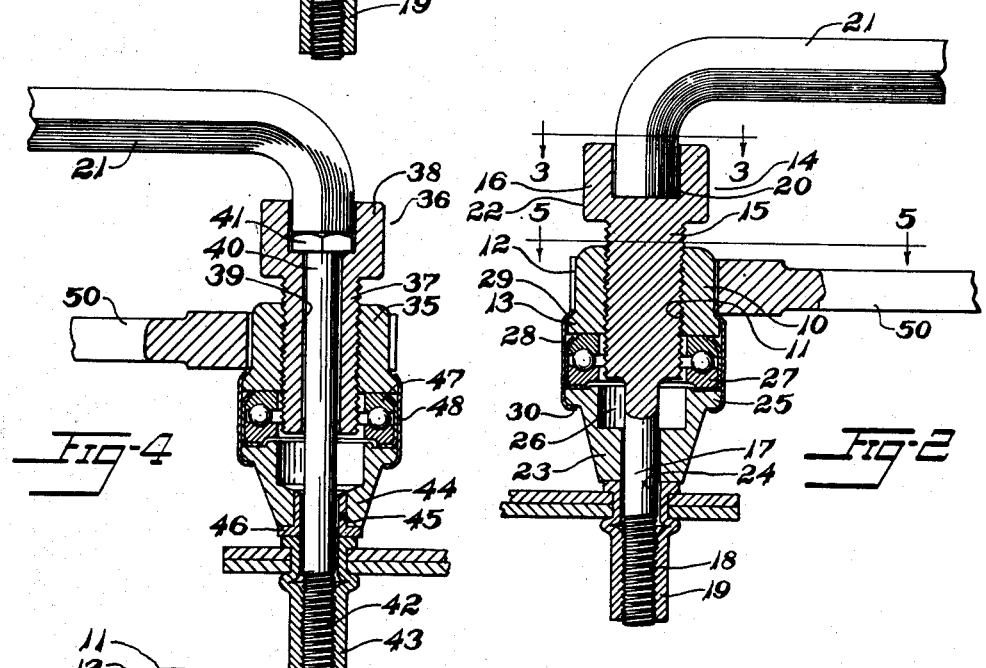
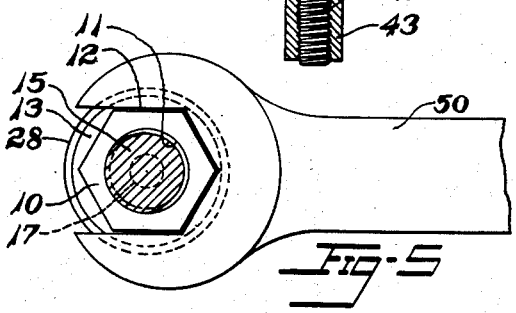
Inventor
Homer E. Wilt Patented June 9, 1953

2,641,378

UNITED STATES PATENT OFFICE 2,641,378

HAND-POWERED TOOL FOR UPSETTING HOLLOW RIVETS

Homer E. Wilt, Akron, Ohio, assignor to The B. F. Goodrich Company, New York, N. Y., a corporation of New York Application June 1, 1949, Serial No. 96,488

4 Claims. (Cl. 218—19)

This invention relates to tools for upsetting hollow tubular rivets and is especially useful in upsetting such rivets provided with internal threads or other anchoring means for engagement by a rotatable draw rod operated by hand power.

Tools heretofore proposed for the purpose of upsetting internally threaded rivets, especially where large rivets were to be installed, have been quite complicated and heavy to handle, and have been of considerable bulk due to the power units employed for their operation, so that in many cases such tools could not be employed in the available space for operation. Such tools have also required electricity, compressed air or other power supply for their operation not always available where rivets were to be installed. Furthermore, such complicated and bulky power tools have been very expensive so that while expedient in factory operation where the great number of rivets to be installed has warranted their cost, their usefulness has been limited by the high cost of investment, as in cases where their required use has been only occasional as in maintenance and repair operations.

A need has existed for simpler and smaller tools powerful enough to install rivets of the larger sizes and requiring small operating space.

The present invention aims to avoid the foregoing and other difficulties by providing a small powerful tool at low cost and capable of hand operation.

The objects of the invention are to provide a tool for the purpose having great power and operable in small space, to prevent undesirable rotary shifting of the anvil by reduction of friction, to provide reduction of torque tending to rotate the rivet relative to the work, to provide for powering of the tool by use of wrenches commonly available to the mechanic, to provide for application of power rotatively by small angular increments, and to provide for simplicity of construction, for convenience of handling, and for economy of manufacture.

These and other objects will appear from the following description and the accompanying drawings.

Of the drawings,

Fig. 1 is a side elevation of a tool constructed in accordance with and embodying the invention including the wrenches for operating it, a rivet inserted in a work piece before upset of the rivet being shown in section with the rivet engaged by the tool before upset of the rivet.

Fig. 2 is an axial sectional view thereof with the rivet upset.

Fig. 3 is a cross-sectional view taken on line 3—3 of Fig. 2.

Fig. 4 is a sectional view similar to Fig. 2 showing a modification of the invention.

Fig. 5 is a sectional view of the tool of Fig. 1, taken on line 5—5 of Fig. 2.

Referring to the drawings and first to Figs. 1 to 3 and 5 thereof, the numeral 10 designates a body resembling a flanged nut and having an internally threaded bore 11, a polygonal, preferably hexagonal outer surface 12, and a radial flange 13. A screw structure 14 has an externally threaded shank portion 15, which engages the threaded bore of the body, means such as a head 16 at one end thereof whereby it may be rotated relative to the body, and at the other end thereof, a cylindrical extension or draw rod 17 of reduced diameter having an externally threaded portion 18 at its end for engaging in the threaded bore of the rivet 19. The head 16 is provided with means for holding it against turning and for turning it when desired. For this purpose it is preferably formed with a hexagonal socket 20 which may be engaged by a hexagonal L-shaped bar wrench 21, and its outer face may be knurled, as at 22. If desired, however, the head may be of polygonal shape to engage an open ended wrench or may have capstan holes for engaging a straight capstan bar wrench.

For applying reaction force to the rivet, an anvil 23 is provided. It has an axial bore 24 closely fitting the draw rod 17 about which it is free to rotate. It has a radial flange 25 for retaining it in relation to the body 10 but permitting relative rotational movement of the anvil and body. For compactness, the anvil may have a counterbore 26 at its flanged end to clear the threaded shank 15 of the screw structure.

The force necessary to upset the rivet, especially with rivets of larger size, is very high and the concentration of force against the anvil is consequently such that reduction of friction between the body of the tool and the anvil becomes a real problem. Excessive friction between the anvil and the body would increase the torque load and permit seizing of these parts while also requiring greater torque to move the body and screw relative to each other. To overcome this difficulty without objectionably increasing the size of the parts of the tool, an annular thrust bearing 27, preferably of the ball or roller type is mounted about the screw between the body and the anvil with the screw freely movable both rotatively and axially through said bearing. The thrust bearing carries the entire axial load between the body and the anvil and facilitates starting of relative rotative movement both in upsetting the rivet and in withdrawing the draw rod therefrom.

For retaining the body 10 the anvil 23 and the thrust bearing 27 in assembled relation while permitting relative rotation of these parts, an annular sleeve 28 extends about the flange 13 of the body and the flange 25 of the anvil and its margins 29, 30 are flanged inwardly thereabout, as by spinning, to loosely retain the parts in the desired relation.

In the modification shown in Fig. 4 the body 35 is like the body 10 of the tool just described. The screw structure 36 has a threaded shank 37 and a head 38 similar to the screw structure of Figs. 1 and 2. The screw structure however has an axial bore 39 and includes a draw rod 40 removably mounted in this bore. The draw rod has a head 41 seated in the hexagonal socket of the head 38 against relative rotation and its opposite end is threaded, as at 42 to engage in the threads of the rivet 43.

The anvil 44 is like the anvil 23 of Fig. 2 except that it has a bore 45 greater than the diameter of the draw rod. A reducing bushing 46 is inserted in the bore 45 and has a radial flange overlying the face of the anvil. The thrust bearing 47 and retaining sleeve 48 are like those of the tool of Fig. 2. The head 41 of the draw rod engages the hexagon socket of the jack screw tightly to hold it in place and it may be of hexagon cross-section to keep it from turning relative to the screw. This construction has an advantage over the construction of Fig. 2 in the draw rods of different sizes, and bushing 46 of correspondingly different sizes may be substituted so that a single tool may be used for upsetting rivets of different sizes.

In the operation of either the tool of Fig. 2 or that of Fig. 4, the head of the screw structure is held stationary while the body of the tool is adjusted along the thread of the screw structure until the draw rod extends through the anvil means by the required distance. A rivet is then screwed onto the draw rod until it engages the anvil. Then the shank of the rivet is inserted through the work piece. With the flange of the rivet abutting the face of the work piece and the tool in place, as seen in Fig. 1, an open end wrench 50 is engaged with the body 10 and the bar wrench 21 is inserted in the socket of the screw structure. Thereafter the screw structure is held against rotation by the wrench 21 while the body is turned by the wrench 50 in a direction to force the body toward the rivet. Movement of the body and screw structure relative to each other axially thereof in this direction creates a compression force between the anvil and the draw rod which upsets the rivet, as seen in Figs. 2 and 4. After collapse of the rivet, wrench 50 may be employed to hold the body of the tool against rotation while the wrench 21 may be rotated to withdraw the threaded end of the draw rod from the work and to return the body to position for the next rivet, the thrust bearing assisting in the reduction of starting torque when withdrawing the draw rod from the rivet.

The tool may be operated in a small space and all power is applied by manipulation of the wrenches. The thrust bearing permits application of a great amount of power without turning of the anvil or of the rivet.

Variations may be made without departing from the scope of the invention as it is defined by the following claims.

I claim:

1. A compact hand-powered riveting tool for outwardly expanding the shank of an internally threaded tubular rivet in work by operation from one side only of the work, said riveting tool comprising a hollow body having an annular outward flange at one end thereof and an internally threaded bore of substantially uniform diameter therein extending from said end to the other end thereof and an outer surface between said ends arranged for separably engaging a hand-manipulable implement to rotate said body, a hollow anvil including an annular outward flange at one end thereof mounted on said body at the flanged end thereof in end-on rotative relation thereto with adjacent ends of said outward flanges facing one another, said anvil presenting a rivet-engaging surface at its other end and said anvil having therethrough a bore, in part of reduced diameter relative to that of the threaded bore in said body, extending to said rivet-engaging surface and arranged in alignment with said threaded bore in the body, a retaining sleeve element extending between and peripherally about both said outward flanges in interlocking engagement therewith and in peripherally slidable relation to at least one flange to hold said body and said anvil in assembled relation one to the other, while accommodating relative rotative movement of said body and said anvil, and a screw structure having an externally threaded shank portion of substantially uniform diameter extending entirely through said threaded bore in said body in threaded engagement therewith from end to end thereof for relative axial movement under relative rotative movement of said body and said screw structure, said shank portion terminating adjacent and spaced from said other end of said body in means integral with said shank portion for separably engaging a second hand-manipulable implement for holding said screw structure against rotation when said body is rotated by manipulation of the first said implement, said screw structure including an extension of reduced diameter as compared to that of said shank portion extending away from said body and said shank portion through said bore in said anvil in snug fitting, slidable and rotative relation thereto and terminating beyond said rivet-engaging surface of the anvil in a threaded portion for insertion into and detachable engagement with an internally threaded tubular rivet to apply axial drawing force thereto, while said rivet-engaging surface applies a reactionary force thereto, upon relative axial movement of said body and said screw structure so as to outwardly expand the shank of said rivet against the work.

2. A compact hand-powered riveting tool for outwardly expanding the shank of an internally threaded tubular rivet in work by operation from one side only of the work, said riveting tool comprising a hollow body having an internally threaded bore of substantially uniform diameter therein extending from an upper end face to a lower end face of said body and an outer surface between said end faces having means for separable engagement with a hand-manipulable implement to rotate said body, a hollow anvil including an upper end face mounted on said body at said lower end face thereof in end-on rotative relation thereto with said upper end face of the anvil spaced from and facing said lower end face of the body, said anvil at its lower end face presenting a rivet-engaging surface and said anvil having a stepped bore extending therethrough to said rivet-engaging surface and arranged in alignment with the threaded bore in said body, anti-friction bearing means in the space between said lower end face of the body and said upper end face of the anvil for facilitating relative rotation of said body and said anvil, retaining means externally of the body and bearing means and anvil interlocking the same in assembled relation one to the other, while accommodating relative rotative movement of said body and said anvil, and a screw structure having an externally threaded shank portion of substantially uniform diameter extending entirely through said threaded bore in said body and into said bearing means and having threaded engagement with said body from end face to end face thereof for relative axial movement under relative rotative movement of said body and said screw structure, said shank portion terminating adjacent and spaced from said upper end face of said body in an end portion including means for separable engagement with a second hand-manipulable implement for holding said screw structure against rotation when said body is rotated by manipulation of the first said implement, said screw structure including an extension of smaller diameter than that of said shank portion extending away from said body and said shank portion through said bore in said anvil in snug fitting, slidable and rotative relation thereto and terminating beyond said rivet-engaging surface of the anvil in a threaded portion for insertion into and detachable engagement with an internally threaded tubular rivet to apply axial drawing force thereto, while said rivet-engaging surface applies a reactive force thereto, upon relative axial movement of said body and said screw structure so as to outwardly expand the shank of the rivet against the work.

3. A riveting tool as defined in claim 13 in which said end portion of said shank portion is enlarged and has an axially-extending polygonal socket therein for receiving the second said implement, and said shank portion has a smooth bore of substantially uniform diameter extending axially therethrough from said socket to the other end of the shank portion; in which said extension of the screw structure is an independent cylindrical draw rod mounted in said smooth bore in said shank portion and having a polygonal head at one end for conformance with said socket and a threaded portion at the other end, said draw rod having separable locking engagement with said shank portion by virtue of slidable insertion of said draw rod threaded-end-first through said socket and said smooth bore in said shank portion and through said stepped bore in said anvil until said head of the draw rod seats conformingly in said socket to prevent relative rotation of said shank portion and said draw rod, while accommodating the second said implement in said socket outwardly of said head therein; and in which said anvil has a replaceable bushing in said stepped bore thereof and about said draw rod in snug fitting slidable relation to the draw rod.

4. A compact hand-powered riveting tool for outwardly expanding the shank of an internally threaded tubular rivet in work by operation from one side only of the work, said riveting tool comprising a hollow body having an upper end face and an annular outward flange at the lower end face thereof and said body having an internally threaded bore of substantially uniform diameter therein extending from end face to end face and a polygonal outer surface between said upper end face and said flange for separable engagement with a hand-manipulable implement to rotate said body, a hollow anvil including an annular outward flange at its upper end face mounted on said body at the flanged lower end thereof in end-on rotative relation thereto with adjacent sides of said flanges spaced-apart and facing one another, said anvil having at its lower end face a rivet-engaging surface and said anvil having a stepped bore therethrough in alignment with the threaded bore in said body to provide a counterbore in said upper end face of the anvil and a relatively smaller diameter bore extending from the counterbore to said rivet-engaging surface, an annular thrust bearing including rolling contact elements in the space between said annular flanges for facilitating relative rotation of said body and said anvil, a retaining sleeve element extending peripherally about both said flanges and said thrust bearing in interlocking relation to said flanges and in peripherally slidable relation to at least one flange to hold the body and anvil and thrust bearing in assembled relation one to the other, while accommodating relative rotative movement of said body and said anvil, and a screw structure having an externally threaded shank portion of substantially uniform diameter extending entirely through said threaded bore in said body and having threaded engagement with said body from end face to end face thereof for relative axial movement under relative rotative movement of said body and said screw structure, said shank portion terminating adjacent and spaced from said upper end face of the body in an enlarged end portion having an axial-extending polygonal socket therein for receiving and separably engaging with a second hand-manipulable implement for holding said screw structure against rotation when said body is rotated by the first said implement, said screw structure including an extension of smaller diameter than that of said shank portion extending away from said body and said shank portion through said stepped bore in said anvil in snug fitting, slidable and rotative relation to said anvil at said smaller diameter bore therein and terminating beyond said rivet-engaging surface of the anvil in a threaded portion for insertion into and detachable engagement with an internally threaded tubular rivet to apply axial drawing force thereto, while said rivet-engaging surface applies a reactionary force thereto, upon relative axial movement of said body and said screw structure so as to outwardly expand the shank of the rivet against the work.

HOMER E. WILT.

References Cited in the file of this patent

UNITED STATES PATENTS

| Number | Name | Date |
| --- | --- | --- |
| 2,336,058 | Bettington | Dec. 7, 1943 |
| 2,370,776 | Carlson | Mar. 6, 1945 |
| 2,410,476 | Appleton | Nov. 5, 1946 |
| 2,473,361 | Carlson | June 14, 1949 |
| 2,501,576 | Novy | Mar. 21, 1950 |
| 2,519,693 | Olin | Aug. 22, 1950 |